Sept. 26, 1933.  E. W. MILLER  1,927,946
WORM WHEEL HOBBING MACHINE
Filed Nov. 1, 1929   4 Sheets-Sheet 1
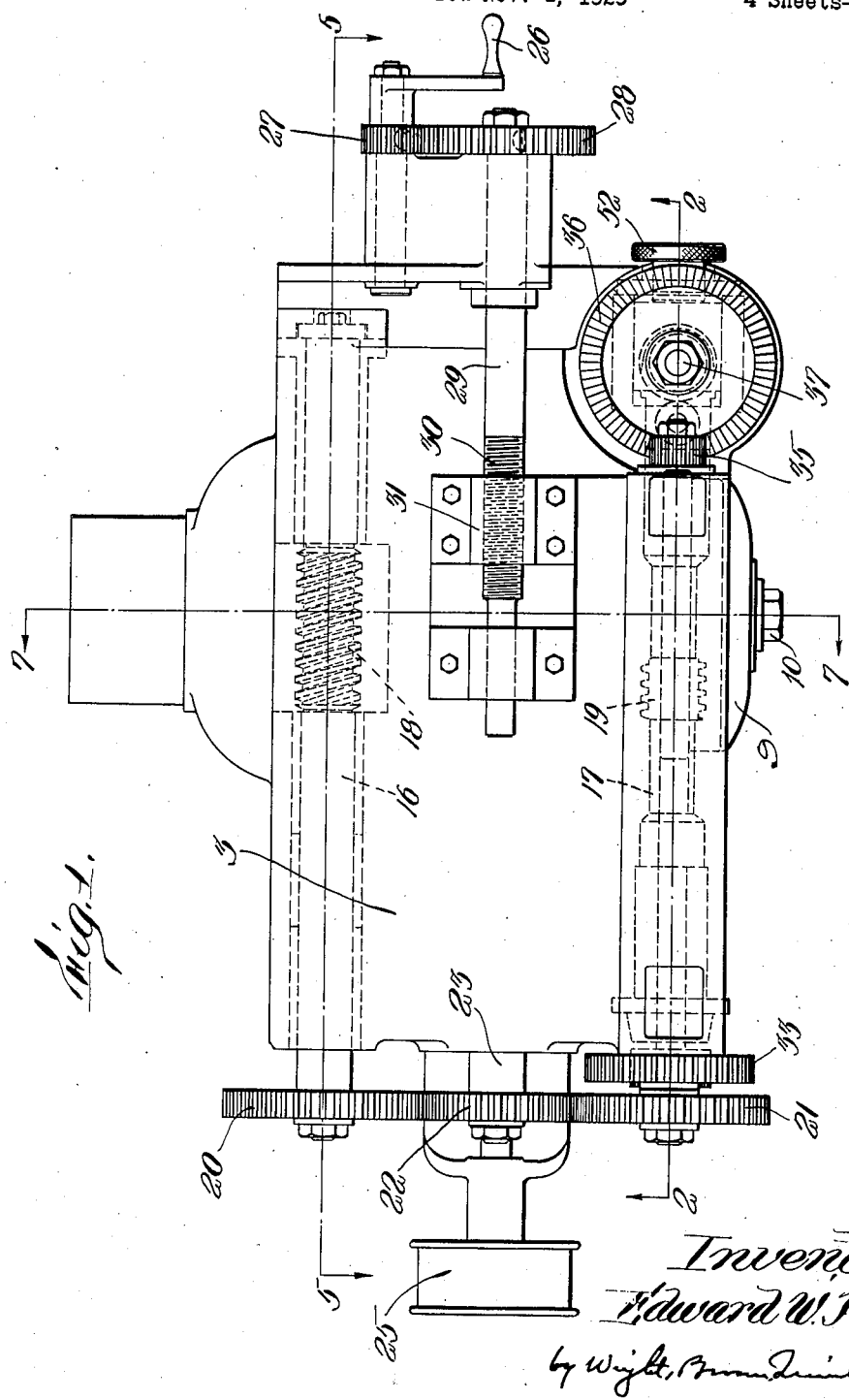
Inventor
Edward W. Miller

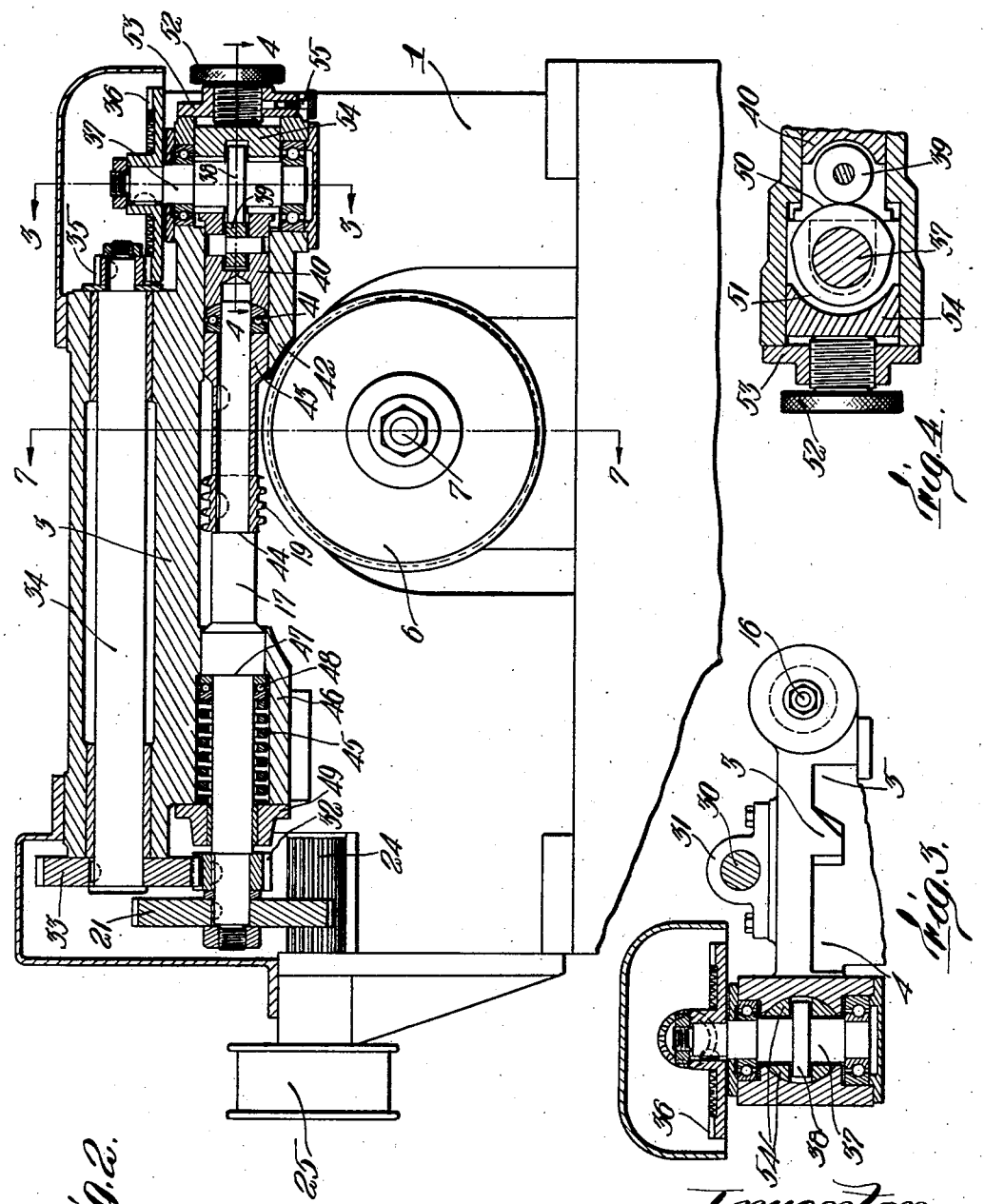

Sept. 26, 1933.  E. W. MILLER  1,927,946
WORM WHEEL HOBBING MACHINE
Filed Nov. 1, 1929  4 Sheets-Sheet 3
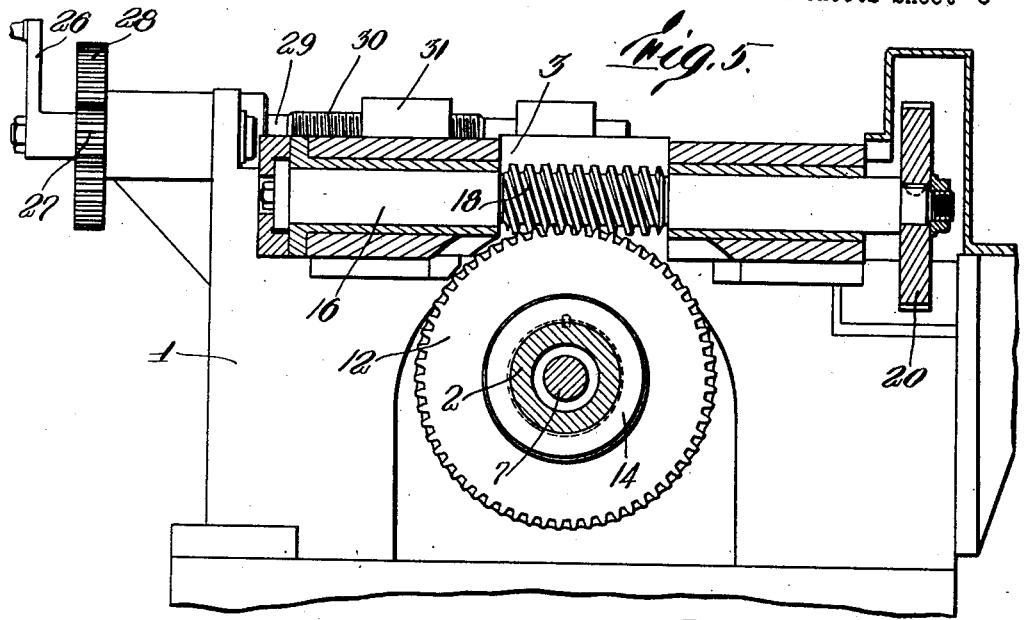
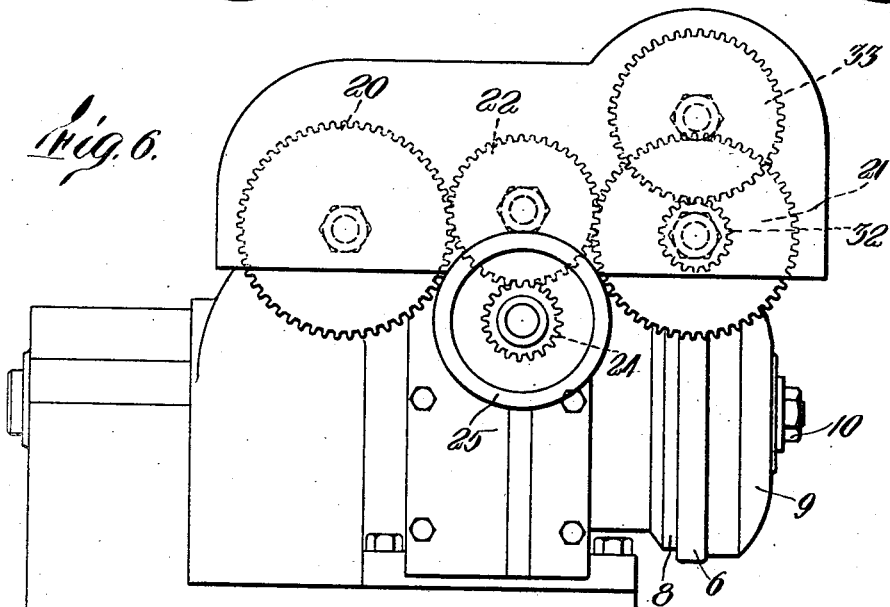
Inventor
Edward W. Miller
by Wright, Brown, Quinby & May
Attys.

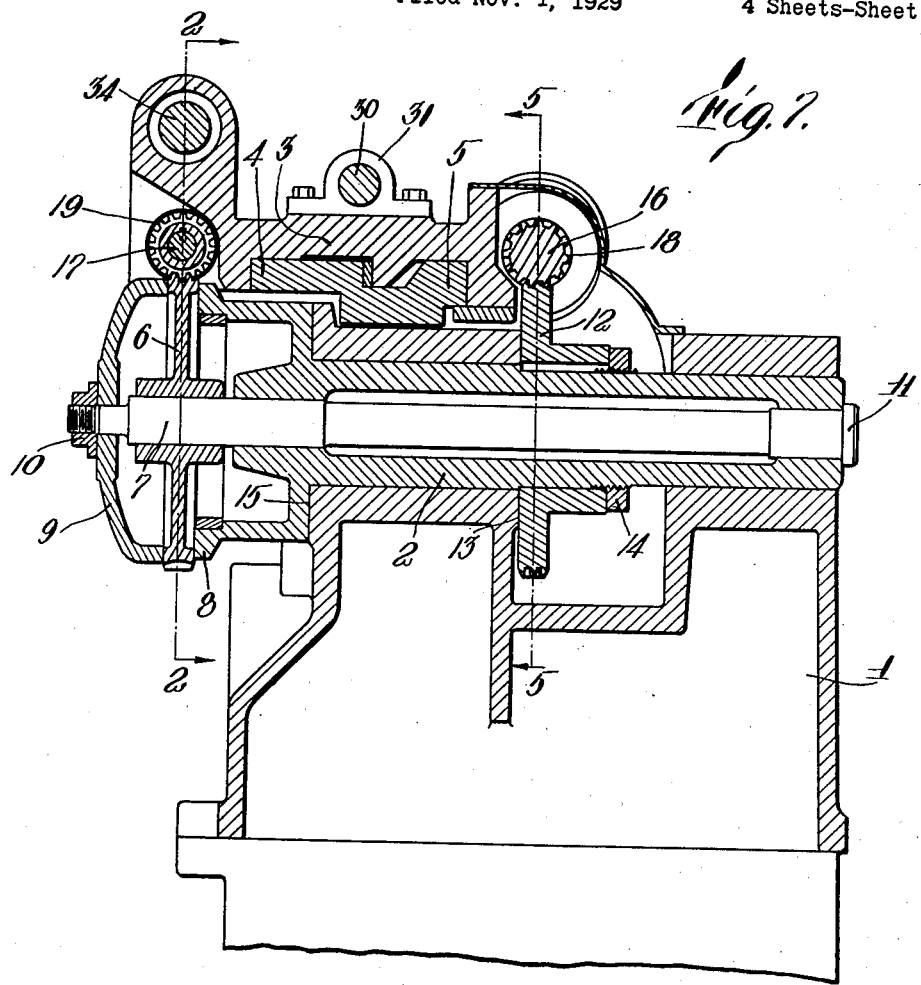
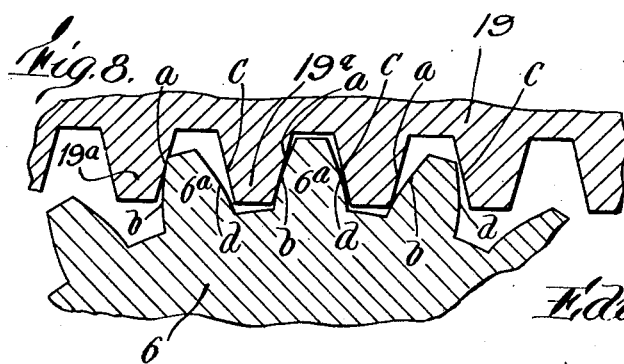

Patented Sept. 26, 1933

1,927,946

UNITED STATES PATENT OFFICE 1,927,946

WORM WHEEL HOBBING MACHINE

Edward W. Miller, Springfield, Vt., assignor to The Fellows Gear Shaper Company, Springfield, Vt., a corporation of Vermont Application November 1, 1929. Serial No. 403,970

8 Claims. (Cl. 90—4)

The present invention relates to machine tools adapted to generate worm wheels and other gears with the use of a hob as the generating cutting tool. Its object is primarily to maintain accuracy in the generated worm wheel teeth as to their pitch, thickness, form and position when the teeth of the hob have been reduced in thickness or width as the result of sharpening. The teeth of hobs, like those of all other metal cutting tools, are beveled on the tops and sides in order to provide cutting clearance and ensure that contact with the work will be limited to their cutting edges. When dull, they are sharpened by grinding away their end faces. Consequently they become narrower when the cutter is first sharpened and they become more and more narrow with each repeated sharpening until the limit of useful life of the cutter is reached. The effect on the work of such narrowing of the cutter teeth is to make the generated teeth of the work piece wider in equal degree, unless compensated for in some manner.

Heretofore compensation for this purpose has been effected by moving the tool nearer to the axis of the work piece, or the work nearer to the axis of the cutter, (in other words diminishing the center distance between the tool and work). This does cause the teeth generated in the work piece to be narrower than would be the case if no compensation were made, because the sides of the cutter teeth are inclined and the spaces between them are narrower near the roots of the teeth than at their outer extremities. But at the same time it generates errors in the face forms of the worm wheel teeth which militate against efficient and quiet cooperation with the mating worm. It is not sufficient that the teeth of the worm wheel have a pitch line width corresponding to that of the spaces between threads of the mating worm merely, but they must also have faces of the correct curvature and locations in order to obtain efficiency in mesh to the desired degree. The greater refinement and higher standard of accuracy which have been required of late years in gearing are applicable also to gearing of the worm wheel type, but the practices heretofore followed in producing worm wheels have not permitted of such accuracy except in the case of worm wheels generated by new hobs, the teeth of which have not been appreciably narrowed by sharpening. A hob, however, is an expensive tool and consideration of economy prevents its being discarded after only short use, as when it first needs sharpening or after having been sharpened but a few times. Consequently a great majority of the worm wheels produced according to the usual commercial practices have been cut by hobs modified through sharpening, and so have been made more or less inaccurate in respect to tooth forms, if not in width of tooth. These practices have made it impossible to maintain at the same time both truth of width and truth of form in worm wheel teeth generated by a hob which has been affected as above indicated by sharpening.

The object and accomplishment of this invention has been to preserve the truth and accuracy in all particulars of worm gear teeth generated by a hob, no matter how greatly the teeth of the hob have been reduced in thickness by sharpening. In carrying this object into effect I have provided the machine tool with means for effecting a relative back and forth, or reciprocative, movement between the hob and the work piece axially of the hob and in an amount sufficient to compensate for thinning of the hob teeth, while the center distance, that is, the distance between the points nearest to one another in the axes of the hob and work, remains the same as that existing before the hob teeth have been reduced in thickness. Such relative movement may be imparted to the tool or to the work piece. In the machine chosen for illustration here, it is given to the tool, and is a reciprocation in the axial direction of the tool.

The invention consists not only in the specific means here illustrated for effecting such movements to obtain the results above mentioned, but also in accessory features of the machine hereinafter described and in all other equivalent embodiments of means for accomplishing the same ends. It is to be understood that the machine here illustrated and described is one of a number of possible machines or means by which the same results may be accomplished within the scope of this invention, and that the following description therefore is to be construed as illustrative, and not limiting, of the invention.

Referring to the drawings,—

Fig. 1 is a plan view of the particular machine containing such illustration;

Fig. 2 is a vertical section of the machine taken on line 2—2 of Fig. 1;

Fig. 3 is a fragmentary cross section on line 3—3 of Fig. 2;

Fig. 4 is a fragmentary horizontal section on line 4—4 of Fig. 2;

Fig. 5 is a vertical section on line 5—5 of Figs. 1 and 7;

Fig. 6 is an end elevation of the machine as seen from the left of Fig. 1;

Fig. 7 is a vertical cross section on line 7—7 of Figs. 1 and 2;

Fig. 8 is a fragmentary sectional view on an enlarged scale of the work and hob taken on a plane radial to the hob and perpendicular to the axis of the work piece, illustrating the manner in which the cutter teeth act alternately on opposite sides upon the work.

Like reference characters designate the same parts wherever they occur in all the figures.

Describing now the specific machine here illustrated, it comprises a base 1 in which a work spindle 2 is rotatably mounted, and on which is supported a slide 3 movable transversely of the spindle, being guided by ways 4, 5, which are rigidly connected with the base. The work piece 6, a worm wheel blank to be cut, is placed on an arbor 7, which passes through the spindle 2, and is clamped against the enlarged end 8 of the spindle by a clamp disk 9, under pressure of a nut 10 screwed on the end of the arbor outside of the clamp disk. The arbor passes through the spindle 2, having close fitting bearings in the end portions thereof, and has a head 11 at the end opposite to the nut 10, overlapping the spindle and providing an abutment for the clamping reaction of the nut.

A master worm wheel 12 is keyed on the spindle 2, being held thereon in contact with a shoulder 13 of the base by a nut 14. It may be noted that a shoulder 15 on the spindle and the master worm wheel 12 embracing between them that part of the base which provides the forward bearing of the spindle, serve as end thrust bearings preventing endwise displacement of the spindle.

In the slide are mounted rotatably two shafts or spindles 16 and 17, which are paralled to one another and extend in the direction of movement of the slide and are in the same planes respectively with the master wheel 12 and the work piece 6. Shaft 16 carries a master worm 18 in mesh with the master worm wheel, and shaft 17 carries the cutting tool, (a hob 19), and is the cutter spindle.

Gears 20 and 21 on the spindles 16 and 17 respectively mesh with an intermediate idle gear 22 which is supported by a stud 23 on the slide and meshes with a long faced pinion 24 which is connected with and driven by a belt pulley 25. Gears 20 and 21 are of the same pitch diameter, whereby the spindles 16 and 17 rotate in the same direction and at the same speed. The hob has the same diameter and pitch as the master worm 18, and the master worm wheel has the same diameter as the work piece. Thus, subject to control by the corrective means presently described, the hob is caused to duplicate the master worm wheel in the work piece.

Feed of the hob tangentially of the work piece from a position at one side of the latter, shown in Fig. 2, to the prescribed depth of cut, is accomplished by movement of the slide 3 in the direction prescribed by the guideways 4 and 5. A manually operated mechanism for thus moving the slide is here shown, consisting of a crank 26 (Fig. 1) connected with a pinion 27 which meshes with a gear 28 on a shaft 29 having a screw 30 engaged with a nut or internally threaded lug 31 on the slide. As the master worm is moved thereby equally with the hob in the axial direction, it imparts an additional angle of rotation to the master wheel and work in due proportion to the feeding movement of the hob.

The machine as thus far described, without anything further, is adapted to generate accurate worm wheels so long as the hob teeth have the same dimensions at their cutting edges as the corresponding parts of the threads in the master worm. But in practice the cutter teeth soon become narrower, due to necessary repeated sharpenings. To compensate for this change in dimensions and to prevent the increased thickness of the worm wheel teeth which would result otherwise, I have provided means for giving an incremental relative movement in alternately opposite directions between the cutter and work such that the opposite side edges of the cutter teeth come into action alternately with opposite sides of the worm wheel teeth being cut. This is illustrated graphically by Fig. 8, where 19a, 19a represent the profiles of several of the cutter teeth in an axial plane of the hob, and 6a, 6a represent the intersections of the worm wheel teeth with the median plane perpendicular to its axis. In short, the plane of section here represented is that of the line 2—2 in Fig. 7. The hob is represented in the condition where its teeth have been thinned by sharpening. In one limit of the incremental movement referred to, the side edges $a$ of the cutter teeth sweep across the side faces $b$ of the worm wheel teeth, while in the other limit the edges $c$ of the cutter teeth act on the side faces $d$ of the worm wheel teeth.

Such incremental movement may be effected in various ways. In the present instance it is obtained by moving the cutter spindle, and the hob therewith, endwise by the following mechanism. A pinion 32 keyed to the cutter spindle drives a gear 33 on a parallel counter shaft 34, which is rotatably mounted in the slide and carries a pinion 35. The latter meshes with a crown gear 36 on a transverse shaft 37 which is so mounted in the slide that its axis crosses the axis of the cutter spindle. A cam 38 on the shaft 37 engages a cam follower roll 39 carried by a plunger 40 which is slidably mounted in the bearing 42 in which one end of the cutter spindle is supported. Plunger 40 acts through an anti-friction thrust bearing 41 on a sleeve 43 which is keyed to the spindle 17 and engages one end of the hob 19, forcing its other end against a shoulder 44 of the spindle. The spindle is adapted to slide endwise in its bearings and is pressed in the opposite direction by a spring 45, contained in the bearing 46, acting against a shoulder 47 on the spindle through an anti-friction thrust bearing 48, and reacting against the cap 49 of the bearing.

Cam 38 has a concentric high dwell 50 and low dwell 51, each extending through nearly half the circumference of the cam and being joined with the other by gradual inclines. The difference in height or radial extent of these dwells is at least as great as the total reduction in thickness which the cutter teeth suffer during the useful life of the hob, and may be somewhat greater. Movement endwise of the hob is limited to an amount equal to the actual thinning of its teeth at any time by an adjustable stop screw 52 which is threaded through a plate 53 on the end of the slide and is adapted to abut against a plunger 54 which is notched and slotted so as to embrace the shaft 37 and cam 38, and the inner end of which contacts with the outer end of plunger 40. A set screw 55 secures the adjustments of this stop screw. As the teeth of the hob become progressively thinner, the stop screw 52 is retracted manually to an equal extent.

It will be evident that the mechanism just described causes the hob to be given a slight endwise movement, additional to its feeding movement, in opposite directions relatively to the slide, and at regular intervals, the frequency of which depends on the ratio of the gear pairs 32—33 and 35—36. It is unimportant how frequent this oscillation is, provided only that the hob remains in each limit of its displacement long enough to cause at least one of its teeth to make a complete traverse across the face of the work piece.

The hob teeth are made with a radial length or height greater than that of the corresponding worm threads to compensate for the cutting clearance or bevel on their outer faces. Hence even after they have been sharpened back to the permissible limit they are still long enough to provide sufficient clearance between the worm wheel teeth for the conjugate worm. Before being ground away to this limit, the hob teeth merely cut excess clearance in the work, which is of no importance.

It will be obvious that substantially the same mechanism for effecting endwise movement may be applied to the master worm spindle so as to oscillate the work piece incrementally with identical results; and that other specific means may be employed to gain the same effect, all within the scope of the generic invention. In its full scope of novelty, as I now conceive it, the invention comprises all embodiments of means in a worm hobbing machine for effecting incremental or additional relative movements between the hob and the work piece such as will cause the cutter teeth to act first on one side and then on the other. By "incremental movement" in this connection I mean an amount additional to the normal cutting movement and feeding travel. The normal cutting travel is compounded of rotation of the work piece and of the hob about their respective axes at speeds corresponding to those of a worm and worm wheel of the same pitch and helix angle running in mesh; and the feeding travel is that which causes the hob to advance until its teeth cut to a prescribed depth in the work piece. The incremental movement herein defined is additional to these movements. So far as I am aware, it is an entirely new feature in machines of this type.

It will be noted that the machine here illustrated has no provision for changing the center distance between the hob and work, but that the compensation for decreasing thickness of the hob teeth is effected wholly and solely by the incremental movement. I do not mean to imply by this that means for effecting incremental movement embodying the principle here illustrated may not be applied to a machine having an adjustment for changing its center distance so as to cut larger or smaller worm wheels, for it is indeed within my contemplation to do so; but only that compensation for decreased tooth thickness of a given hob when cutting worm wheels of a given pitch diameter and pressure angle is made solely by the incremental movement. I have intentionally chosen for illustration here a machine of the simplest character designed to cut worm wheels of a very restricted range, and having a manual depth feed, in order to illustrate more clearly the fundamental principles of the invention by eliminating complications due to the additional mechanism required for giving an automatic feed and for making the machine adjustable to cut worms of a wide range of diameter, pitch and pressure angle. My contemplation includes completely automatic and widely adjustable machines for the purposes herein specified, but the fundamental principles are as adequately illustrated by the simple machine herein described.

The same principles as to incremental movement of the hob relative to the work may be applied to hobbing machines adapted to cut other kinds of gear as well as worm gears, within the scope of this invention.

What I claim and desire to secure by Letters Patent is:

1. A worm wheel hobbing machine comprising a base, a work spindle rotatably mounted in said base adapted to support a work piece, a master worm wheel secured to said spindle, a slide mounted on said base for movement transversely of the work spindle, parallel spindles rotatably bedded in said slide, a master worm mounted on one of the last named spindles meshing with said master worm wheel, a hob mounted on the other spindle in position to cut the work piece, means for moving said slide to effect depth feed of the hob into the work, and means for giving an independent endwise reciprocatory movement to one of the slide-carried spindles whereby to produce a relative incremental movement repeatedly in opposite directions between the hob and work piece compensatory for deficiency in the width of the hob teeth.

2. A worm wheel hobbing machine comprising a base member, a slide member mounted to move in a prescribed path with respect to said base, a work spindle mounted on one of said members transverse to the direction of movement of the slide member, a cutter spindle mounted in the other member and extending substantially in the direction of said movement, a hob carried by the cutter spindle, means for moving said slide whereby to effect relative depth feeding traverse between the hob and work spindle, and means for effecting an independent back and forth endwise movement of the cutter spindle, incremental to, and during, the movement of said slide.

3. A worm wheel hobbing machine comprising a work spindle, a tool spindle transverse to the work spindle, a hob on said tool spindle adapted to cut teeth in the rim of a worm wheel blank mounted on the work spindle, means for rotating said spindles in harmony with one another at rates corresponding to those of a worm and worm wheel running together, and means for moving said tool spindle back and forth endwise, repeatedly during the course of operation on a single work piece by a distance equal to a predetermined difference between the tooth spaces to be cut in the work and the longitudinal thickness of the hob teeth.

4. A worm wheel hobbing machine comprising means for supporting and rotating in timed relation and on axes perpendicular to one another a hob and a worm wheel blank, means for effecting a relative incremental tangential movement between the hob and wheel blank alternately in opposite directions, whereby the tooth spaces in the work are cut wider than the hob teeth and are finished on opposite sides by the alternate action of opposite side edges of the hob teeth, and means for maintaining an invariable distance between said axes throughout said operation.

5. A worm wheel cutting machine which comprises independently rotatable spindles related to one another as the axes of a worm and a worm wheel, a hob on one of said spindles having teeth narrower than the finished tooth spaces to be cut in the work piece, means for rotating said spindles in harmony with one another, and means for shifting said hob axially back and forth by a distance equal to the difference between such spaces and the width of its teeth, repeatedly in the course of finishing a single work piece.

6. A worm wheel cutting machine which comprises independently rotatable spindles related to one another as the axes of a worm and a worm wheel, a hob on one of said spindles having teeth narrower than the finished tooth spaces to be cut in the work piece, means for rotating said spindles in harmony with one another, the hob spindle being movable endwise, means including a cam and an adjustable limit stop for so moving said spindle back and forth a distance equal to the difference between the width of such spaces and the width of the hob teeth, and means for driving said cam in timed relation to the rotation of the spindles.

7. A worm wheel cutting machine comprising a work spindle, a master worm wheel thereon, a master worm in mesh therewith, a shaft on which said master worm is mounted, a hob carrying shaft and a hob thereon in position to cut teeth in a work piece mounted on said work spindle, one of said shafts being movable endwise, and means for so moving such movable shaft back and forth through a predetermined limited distance at a rate in timed relation to their rotational rate, whereby spaces are cut in the work of a width greater by a predetermined amount than the width of the hob teeth, by repeated alternate action of the opposite side edges of such teeth.

8. A worm wheel cutting machine comprising a work spindle, a master worm wheel thereon, a master worm in mesh therewith, a shaft on which said master worm is mounted, a hob carrying shaft and a hob thereon in position to cut teeth in a work piece mounted on said work spindle, one of said shafts being movable endwise, a cam acting on said movable shaft for so moving it in one direction, yielding means acting in the opposite direction on said shaft, an adjustable stop for limiting the movement of the shaft in the last named direction, and means for driving said cam at a definite speed ratio to the rotational speed of said shafts.

EDWARD W. MILLER.